United States Patent
Tramoni

(10) Patent No.: US 10,770,891 B2
(45) Date of Patent: Sep. 8, 2020

(54) PROTECTION OF AN NFC ROUTER AGAINST OVERVOLTAGE

(71) Applicant: STMicroelectronics (Rousset) SAS, Rousset (FR)

(72) Inventor: Alexandre Tramoni, Le Beausset (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 470 days.

(21) Appl. No.: 15/842,621

(22) Filed: Dec. 14, 2017

(65) Prior Publication Data
US 2018/0262002 A1    Sep. 13, 2018

(30) Foreign Application Priority Data

Mar. 10, 2017    (FR) ...................... 17 51995

(51) Int. Cl.
| | |
|---|---|
| *H02H 9/04* | (2006.01) |
| *H04B 5/00* | (2006.01) |
| *G06K 7/10* | (2006.01) |
| *G06K 19/07* | (2006.01) |
| *H02J 50/10* | (2016.01) |
| *H02J 7/02* | (2016.01) |

(52) U.S. Cl.
CPC ........... *H02H 9/04* (2013.01); *G06K 7/10009* (2013.01); *G06K 7/10148* (2013.01); *G06K 19/0715* (2013.01); *H02H 9/041* (2013.01); *H02J 50/10* (2016.02); *H04B 5/0031* (2013.01); *H04B 5/0075* (2013.01); *H04B 5/0081* (2013.01); *H02J 7/025* (2013.01)

(58) Field of Classification Search
CPC ............. H02J 7/025; H02J 50/10; H02J 50/12
See application file for complete search history.

(56) References Cited

U.S. PATENT DOCUMENTS

| | | | |
|---|---|---|---|
| 2015/0054345 A1* | 2/2015 | Monat ..................... | H02J 50/10 307/104 |
| 2016/0087430 A1* | 3/2016 | Sheikholeslami ...... | H02J 7/025 361/80 |

* cited by examiner

*Primary Examiner* — David V Henze-Gongola
(74) *Attorney, Agent, or Firm* — Slater Matsil, LLP

(57) ABSTRACT

The invention relates to a device for protecting a near field communication router against possible over-voltages picked up by an antenna. The device includes two voltage-limiter elements between terminals of the antenna and a ground. A circuit detects the presence of an electromagnetic field in the vicinity of an operating frequency of the router, and controls the limiter elements, the limiter elements being active by default.

25 Claims, 1 Drawing Sheet

PROTECTION OF AN NFC ROUTER AGAINST OVERVOLTAGE

CROSS-REFERENCE TO RELATED APPLICATIONS

This application claims priority to French Application No. 1751995, filed on Mar. 10, 2017, which application is hereby incorporated herein by reference.

TECHNICAL FIELD

The present description relates generally to electronic circuits and mobile communications equipment and, more particularly, devices equipped with Near Field Communication (NFC) circuits.

BACKGROUND

Numerous devices are now offered with near field communication functions. The most widespread are mobile telecommunication devices (mobile telephones or smartphones), which are increasingly often equipped with a near field communication interface, generally dubbed an NFC router, endowing the telephone with additional functionalities. NFC routers allow a mobile device to operate either in card mode or in reader mode. In card mode, the device has the functions of a contactless communication card. In reader mode, the device has the functions of a contactless card reading and/or writing station.

In reader mode, the device uses its rechargeable battery to emit a high-frequency field able to be picked up by another device operating in card mode.

In card mode, the mobile communication device is able to operate by being powered by the field radiated by a station with which it communicates and without resorting to the energy of the battery of the device. This makes it possible, in particular, to endow a mobile telephone with functions similar to those of contactless cards even though the telephone is discharged or turned off. In recent devices, the device can also operate in card mode by using the battery of the device, the electromagnetic field being used for communication.

The battery of the device is generally charged by being hooked up, by way of a charger, to the electrical distribution network, to a dynamo, to a solar panel, etc.

More recently, NFC devices equipped with batteries have begun to appear, the batteries of which are recharged in near field, using a different frequency band for recharging than the frequency band used for communications.

SUMMARY

The present description relates generally to electronic circuits and mobile communications equipment and particular embodiments relate to devices equipped with Near Field Communication (NFC) circuits. For example, some embodiments related to devices that include an NFC circuit and a rechargeable battery.

Embodiments alleviate all or some of the drawbacks of the devices allying battery and near field communication interface.

Thus, one embodiment provides for a device for protecting a near field communication router against possible over-voltages picked up by an antenna. The device includes: two voltage-limiter elements between terminals of the antenna and a ground. A detection circuit can detect presence of an electromagnetic field in the vicinity of an operating frequency of the router, and control the limiter elements, the limiter elements being active by default.

According to one embodiment, each limiter element includes one or more voltage-limiter components, in series with a switch controllable by the detection circuit.

According to one embodiment, the detection circuit includes: an element for field detection and clock extraction; and a comparator. A first input of the comparator receives a signal from the detection element and a second input of the comparator receives a reference clock corresponding approximately to the said operating frequency of the router.

According to one embodiment, the comparator controls the limiter elements.

According to one embodiment, the detection circuit is powered by a battery, such as a rechargeable battery.

According to one embodiment, the operating frequency of the router is about 13.56 MHz.

One embodiment provides for a near field communication device that includes at least one antenna, a near field communication router connected to the antenna, and a device for protecting the router against possible over-voltages picked up by the antenna.

One embodiment provides for a portable communication device including a device for protecting a near field communication router against possible over-voltages picked up by an antenna.

One embodiment provides for a portable communication device including a near field communication device.

One embodiment provides for a method for protecting a contactless communication router against possible over-voltages, including the steps of limiting by default the voltage across the terminals of an antenna to which the router is connected, and deactivating the limitation of the voltage across the terminals of the antenna in the presence of a field in the vicinity of an operating frequency of the router.

BRIEF DESCRIPTION OF THE DRAWINGS

These characteristics and advantages, as well as others, will be set forth in detail in the following non-limiting description of particular embodiments, given in conjunction with the attached figures among which.

DETAILED DESCRIPTION OF ILLUSTRATIVE EMBODIMENTS

Like elements have been designated by like references in the various figures.

For the sake of clarity, only the steps and elements useful to the understanding of the embodiments which will be described have been represented and will be detailed. In particular, the manner of operation of a near field communication router has not been detailed, the embodiments described being compatible with the usual manner of operation. Moreover, the applications of a device or system integrating such a router have not been detailed either, the embodiments described being, here again, compatible with the usual applications.

Unless specified to the contrary, when reference is made to two elements connected together, the meaning is that they are directly connected without any intermediate element other than conductors, and when reference is made to two elements linked together, the meaning is that these two elements can be directly linked (connected) or linked by way of one or more other elements.

In the description which follows, when reference is made to the terms "approximately", "about" and, "of the order of", the meaning is to within 10%, preferably to within 5%.

Figure 1:
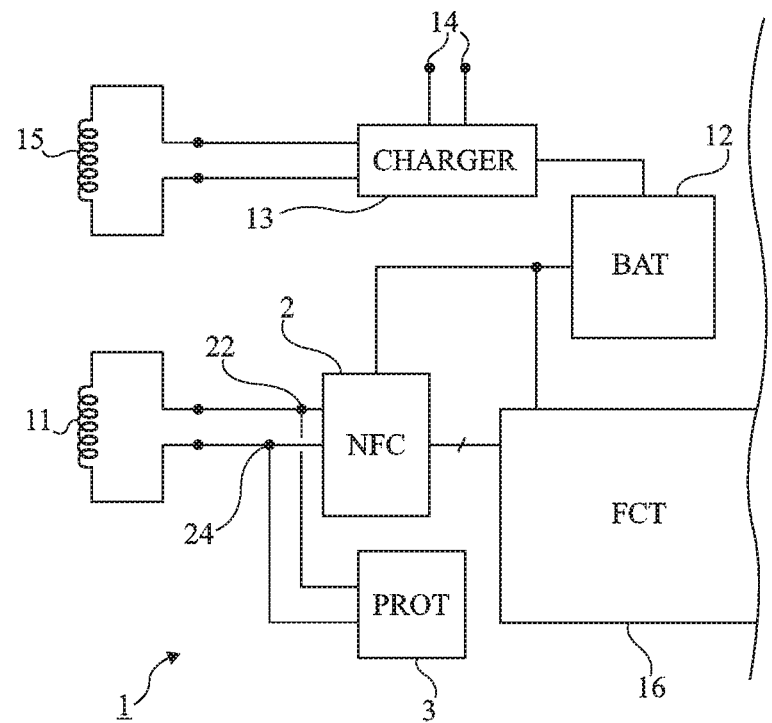
FIG. 1 is a partial and schematic block diagram of an exemplary electronic device of the type to which the embodiments which will be described applies.

FIG. 1 is a schematic representation, in the form of blocks, of a near field communication system partially illustrating an embodiment of a mobile device equipped with a battery and a near field communication module.

The device 1 includes, inter alia, a near field communication interface 2 (NFC) connected to an antenna 11 so as to communicate with a station (not represented) when the device 1 is a short distance from the station. The device 1 furthermore includes a battery 12 for operating this device independently of the near field communication mode.

The battery 12 can be charged by using a charger 13 (CHARGER) with which the device 1 is equipped and which receives a DC voltage from terminals 14 intended to be hooked up to an exterior transformer (not represented). The battery 12 can also be charged in near field by picking up, with the aid of an antenna 15, the energy radiated by a recharging terminal or station (not represented).

The device 1 furthermore includes diverse processing circuits as a function of its nature. These circuits have been symbolized in FIG. 1 by a block 16 (FCT). These circuits are able to be powered by the battery 12 and, some of them at least, are able to communicate with the NFC router 2.

The charger 13 of the battery 12 is generally a voltage regulating system making it possible to provide the battery 12 with a suitable charging voltage and to control the charging of the battery.

Ever more devices equipped with near field communication functions, for example mobile telephones, are able to be recharged in near field by dedicated terminals, different from the communication stations, and therefore include two antennas 11 and 15.

Recharging terminals are generally more powerful than communication stations. They use a frequency or a band of frequencies that differ from the band used for communications according to the NFC standard (around a frequency of the order 13.56 MHz).

In certain cases, the recharging frequency is sufficiently far from the communication frequency band as not to be picked up by the communication antenna 11 or to be picked up with so low a quality factor that this poses no problem.

However, certain recharging terminals operate at frequencies (typically of several MHz, for example of the order of 6.8 MHz) that are near the band of communication frequencies.

A problem is then that the energy radiated by the recharging terminal is picked up by the antenna 11 and may damage the NFC router 2. Indeed, the recharging terminals are made so as to recharge the battery 12 as rapidly as possible and the power of the field is significantly greater than that of the near field communication stations.

According to the embodiments described, provision is made to equip the device 1 with a circuit 3 (PROT) for protecting the NFC router 2 against overloads that may originate from near-field recharging terminals or other high-power electromagnetic fields that are outside the vicinity of NFC frequencies, that is to say outside of frequencies of the order of 13.56 MHz. The example of 13.56 MHz is taken hereinafter, but, more generally, provision is made for protection outside of the operating frequencies of the communication router.

The role of the circuit 3 is to limit the voltage present on each terminal 22, 24 of the NFC router 2 connected to the antenna 11 when the frequency picked up is not in the vicinity of 13.56 MHz.

Figure 2:
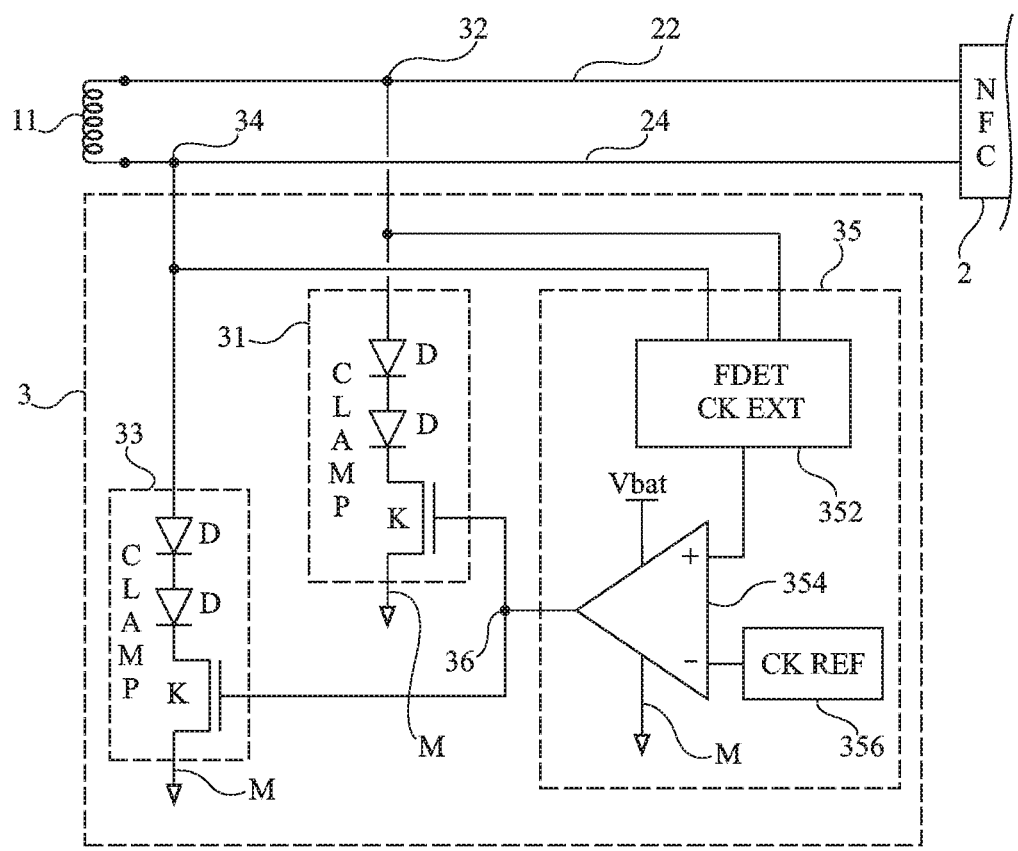
FIG. 2 is a block diagram illustrating an embodiment of a circuit for protecting an NFC router.

FIG. 2 represents, in a very schematic manner and in the form of blocks, an embodiment of a circuit 3 for protecting an NFC router 2 against potential overloads.

The circuit 3 includes two terminals 32 and 34 respectively connected to the conductors 22 and 24 connecting the router 2 to the antenna 11. In practice, the conductors 22 and 24 are electrically merged with the terminals of the antenna n and with the input terminals of the router 2. The circuit 3 includes two controllable voltage limiter (CLAMP) elements 31 and 33, respectively connected to the terminals 32 and 34, and to the ground M of the device 1. The limiters 31, 33 are controlled by a circuit 35 for detecting presence of an electromagnetic field at a frequency of about 13.56 MHz. The limiter elements 31 and 33 are active by default and are deactivated in the presence of such a field so as not to limit the excursion in voltage across the terminals of the antenna 11 in the presence of a useful field (in the vicinity of 13.56 MHz) which otherwise would prevent correct operation of the NFC router 2. The detection circuit 35 includes two input terminals connected to the input terminals of the circuit 3, therefore to the terminals 32 and 34 to detect the presence of a field and its frequency, and an output terminal 36 providing a control signal for the limiters 31 and 33.

In the example represented, each limiter element 31, 33 includes a switch K, for example an MOS transistor, whose control terminal (the gate) is connected to the terminal 36. Each switch K is associated in series with one or more diodes D between the terminal 32, respectively 34, and the ground M. Thus, when the switches K are closed (on), the voltage on each conductor 32, 34 is limited to the sum of the voltage drops in the diodes D (plus the voltage drop in the switch K in the on state). When the switches K are open (off), the potentials of the conductors 32 and 34 are not limited.

In the example represented, the circuit 35 includes a circuit 352 for field detection (FDET) and for clock extraction (CK EXT). The circuit 35 also includes a comparator 354 a first input (+) of which receives a signal from the circuit 352 (e.g., a signal extracted from terminals of the antenna, such as a clock signal) and a second input of which receives a reference clock 356 (CK REF) of about 13.56 MHz. An output of the comparator 35 (for example a digital signal) constitutes the circuit 35 output dispatched to the control terminals of the switches K of the elements 31 and 33.

The circuit 35, and more particularly the comparator 354, is powered by the voltage Vbat of the battery (12, FIG. 1) of the device 1, so as to allow a closed state by default of the transistors K and therefore a protection state by default.

The frequency discrimination performed by the circuit 35 does not need to be precise. Indeed, in the application envisaged, one seeks essentially to distinguish a frequency in the neighborhood of 6.8 MHz from a frequency of about 13.56 MHz.

An advantage of the embodiments described is to ensure protection of the router against possible over-voltages across the terminals of the antenna.

Another advantage of the embodiments described is that this protection has no impact on the operation of the router.

Another advantage of the embodiments described is that they do not require any modification of the router, or of the antenna circuit. They are therefore compatible with contemporary devices.

Diverse embodiments have been described, diverse variants and modifications will be apparent to the person skilled in the art. In particular, although the embodiments have been described in conjunction with an exemplary application to a frequency of 13.56 MHz, they apply more generally to a protection of the router by limitation of the voltage on each terminal of the antenna outside the vicinity of an operating frequency of the router. Furthermore, the practical implementation of the embodiments and the rating of the components is within the scope of the person skilled in the art on the basis of the functional description given hereinabove and the structures given for the circuits 31, 33 and 35 are merely examples and can be modified under the proviso that the same function is ensured.

What is claimed is:

1. A device comprising:
   a first antenna terminal;
   a second antenna terminal;
   a ground terminal;
   a near field communication circuit coupled to the first and second antenna terminals, the near field communication circuit configured to operate at an operating frequency;
   a first voltage-limiter coupled between the first antenna terminal and the ground terminal;
   a second voltage-limiter coupled between the second antenna terminal and the ground terminal; and
   a controller configured to detect, at the first and second antenna terminals, an electromagnetic field having a frequency that corresponds to the operating frequency, and to control the first and second voltage-limiters based upon the detected electromagnetic field, wherein the first and second voltage-limiters are active by default and wherein the controller is configured to deactivate the first and second voltage-limiters after detecting that the frequency corresponds to the operating frequency of the near field communication circuit.

2. The device of claim 1, wherein the first and second voltage-limiters each comprise one or more voltage-limiter components in series with a switch having a control input coupled to an output of the controller.

3. The device of claim 2, wherein the one or more voltage-limiter components comprise diodes.

4. The device of claim 1, wherein the controller comprises:
   a first circuit for field detection and clock extraction; and
   a comparator having a first input coupled to the first and a second input coupled to a reference clock generator, the reference clock generator configured to generate a reference frequency corresponding to the operating frequency of the near field communication circuit.

5. The device of claim 4, wherein the comparator is coupled to control the first and second voltage-limiters.

6. The device of claim 1, wherein the controller is powered by a battery.

7. The device of claim 1, wherein the operating frequency of the near field communication circuit is about 13.56 MHz.

8. The device of claim 1, further comprising an antenna coupled to the first and second antenna terminals.

9. A device comprising:
   a first antenna terminal;
   a second antenna terminal;
   a ground terminal;
   a near field communication circuit coupled to the first and second antenna terminals;
   a first voltage-limiter coupled between the first antenna terminal and the ground terminal;
   a second voltage-limiter coupled between the second antenna terminal and the ground terminal;
   a field detector coupled to the first and second antenna terminals;
   a reference clock generator; and
   a comparator with a first input coupled to an output of the field detector, a second input coupled to an output of the reference clock generator, and an output coupled to a control input of the first voltage-limiter and to a control input of the second voltage-limiter.

10. The device of claim 9, wherein the first and second voltage-limiters each comprise a voltage-limiter component in series with a switch having a control input coupled to the output of the comparator.

11. The device of claim 10, wherein the first and second voltage-limiters each comprise a plurality of voltage-limiter components in series with the switch.

12. The device of claim 9, wherein the first voltage-limiter comprises a first plurality of diodes coupled in series with a first switch that has a control input coupled to the output of the comparator; and
   wherein the second voltage-limiter comprises a second plurality of diodes coupled in series with a second switch that has a control input coupled to the output of the comparator.

13. The device of claim 9, further comprising an antenna coupled to the first and second antenna terminals.

14. The device of claim 13, further comprising:
   a battery coupled to the comparator;
   a second antenna; and
   a charger coupled between the second antenna and the battery.

15. A near field communication device comprising:
   an antenna;
   a near field communication circuit coupled to the antenna, the near field communication circuit configured to operate at a first frequency;
   a first switch coupled between a first terminal of the antenna and a ground terminal,
   a second switch coupled between a second terminal of the antenna and the ground terminal; and
   a controller configured to extract a clock signal from a signal received at the antenna, to compare the extracted clock signal with a reference clock signal to produce a comparison result, and to control the first and second switches based on the comparison result.

16. The near field communication device of claim 15, wherein the first switch comprises a first transistor and the second switch comprises a second transistor.

17. The near field communication device of claim 15, further comprising:
   a second antenna;
   a rechargeable battery; and
   a charger circuit coupled between the rechargeable battery and the second antenna.

18. The near field communication device of claim 15, wherein the controller is configured to turn off the first and second switches when a frequency of the extracted clock signal is equal to a frequency of the reference clock and turn on the first and second switches when the frequency of the extracted clock is not equal to the frequency of the reference clock signal.

19. The near field communication device of claim 15, further comprising:
   a first diode having an anode coupled to a first terminal of the antenna and a cathode coupled to the first switch; and
   a second diode having an anode coupled to a second terminal of the antenna and a cathode coupled to the second switch.

20. The near field communication device of claim 15, further comprising a battery coupled to the near field communication circuit.

21. A method of overvoltage protection for a contactless communication device, the method comprising:
   using a voltage limiter to limit a voltage across terminals of an antenna coupled to the contactless communication device;
   detecting an electromagnetic field having a first frequency, the electromagnetic field being detected at the terminals of the antenna;
   after detecting the electromagnetic field having the first frequency, turning off the voltage limiter; and
   while the voltage limiter is off, receiving a signal having the first frequency at the contactless communication device.

22. The method of claim 21, wherein detecting the electromagnetic field having the first frequency comprises:
   extracting a clock signal from the antenna; and
   comparing the extracted clock signal with a reference clock signal.

23. The method of claim 22, wherein limiting the voltage across the terminals of the antenna comprises turning on a first switch coupled between a first terminal of the antenna and a ground terminal and turning on a second switch coupled between a second terminal of the antenna and the ground terminal.

24. The method of claim 23, wherein turning off the limiting of the voltage across the terminals of the antenna comprises turning off the first switch and turning off the second switch.

25. The method of claim 21, wherein the first frequency is about 13.56 MHz.

* * * * *